United States Patent [19]

Johnson

[11] Patent Number: 4,723,662

[45] Date of Patent: Feb. 9, 1988

[54] ARTICLE STORAGE RACK

[76] Inventor: Charles A. Johnson, 1006 Columbia, Lawton, Okla. 73507

[21] Appl. No.: 929,739

[22] Filed: Nov. 12, 1986

[51] Int. Cl.⁴ .............................................. A47G 19/08
[52] U.S. Cl. .......................................... 211/41; 312/13
[58] Field of Search ....................... 211/41, 40, 71, 42, 211/72, 126, 70.6, 70.1; 312/9, 13, 10; 206/387; 361/415

[56] References Cited

U.S. PATENT DOCUMENTS

| | | | |
|---|---|---|---|
| D. 231,063 | 4/1974 | Rafaat | 211/40 UX |
| 3,756,383 | 9/1973 | Kryter | 206/387 |
| 4,317,603 | 3/1982 | Pepicelli et al. | 312/13 X |
| 4,396,123 | 8/1983 | Swan | 211/40 |
| 4,557,389 | 12/1985 | Williams et al. | 211/13 |

Primary Examiner—Ramon S. Britts
Assistant Examiner—Sarah A. Lechok Eley
Attorney, Agent, or Firm—Laney, Dougherty, Hessin & Beavers

[57] ABSTRACT

A storage rack for storing compact audio discs or other relatively small containers or boxes of right parallelepiped configuration, so that a maximum number of containers can be stored in a way which will afford ready access to each. The storage rack includes a series of side-by-side grooves or slots, each of which defines a right angular corner or angulation in which the corner of the compact disc container or other parallelepiped-shaped container can be rested. The angulations of adjacent slots are offset in a way which causes the stored containers set therein to be offset from each other, and therefore to present individual corners of the several containers for easy grasping when it is desired to remove a single one of the containers from the rack.

13 Claims, 6 Drawing Figures

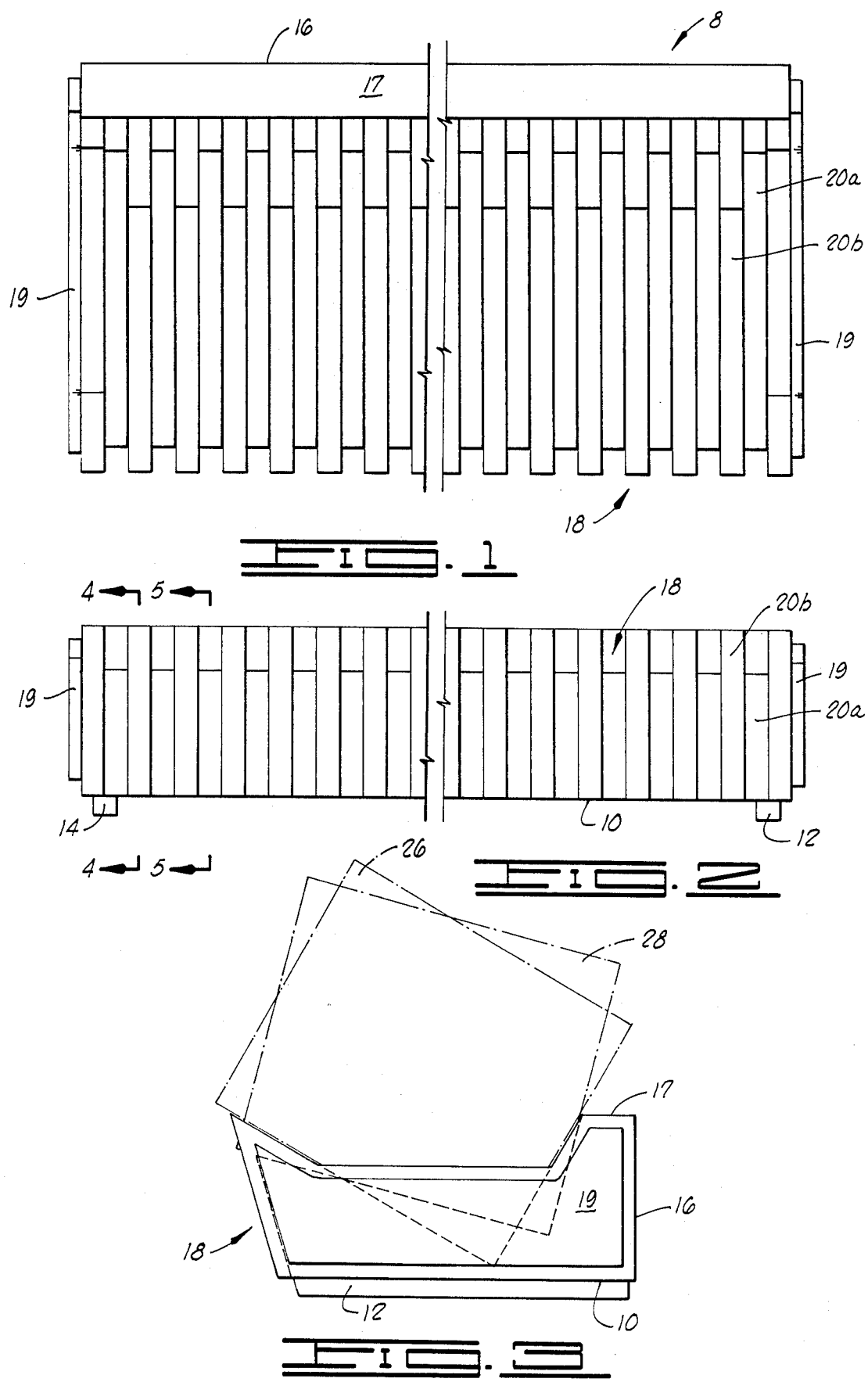

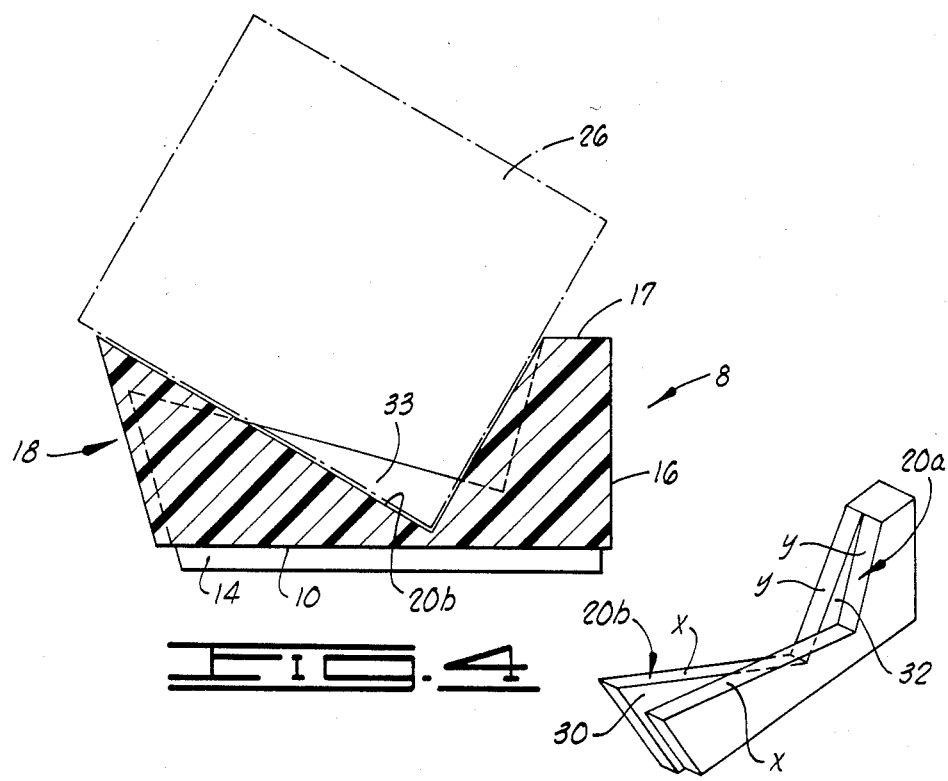
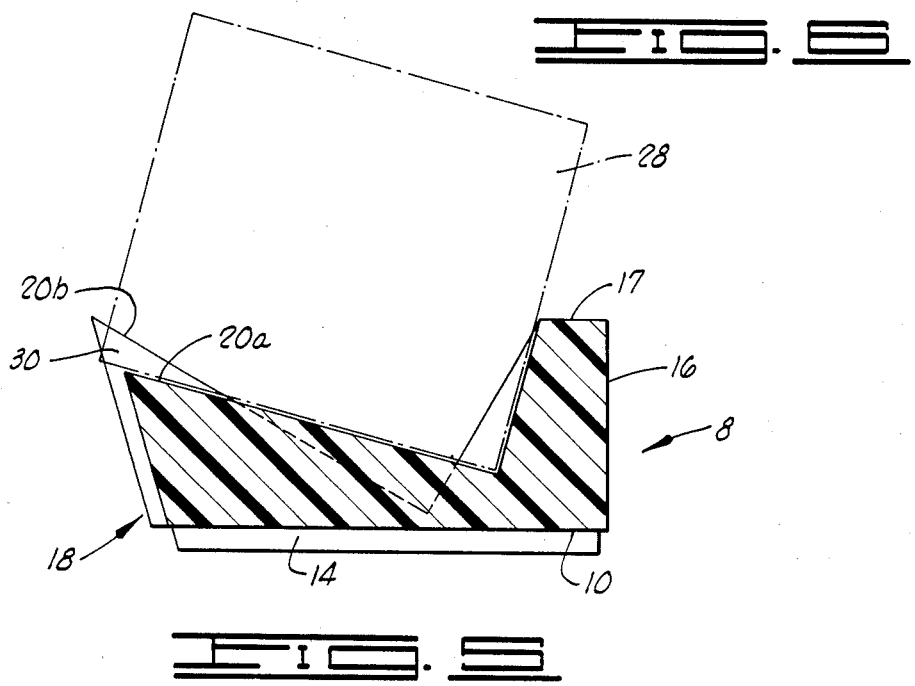

ARTICLE STORAGE RACK

FIELD OF THE INVENTION

This invention relates to racks for storing articles of a right parallelepiped configuration, such as cases or containers for compact audio discs or magnetic recording tape cassettes, or the like, so that a maximum number of the articles can be located in contiguous relation to each other, and the articles can be easily removed from the rack with a minimum of effort and difficulty, and a minimum amount of disruption to the other adjacent articles.

BACKGROUND OF THE INVENTION

Brief Description of the Prior Art

A number of types of racks which can be tested upon table tops or the like, and used to support relatively small articles of a right parallelepipid configuration, have been previously proposed.

One rack of this type is illustrated and described in U.S. Pat. No. 4,317,603. This patent discloses a structure capable of being used in such a way that small, flat, right parallelepiped containers can be alternated from one position to the other to present a corner and to thereby allow access to the containers and easy handling thereof. This rack is used for videotape cartridges, and each of the slots or bins which are provided are of the same configuration, but an article when stored in the rack can be deliberately canted forward, if desired, so that it extends at a different angle with respect to the others in order to facilitate its removal. Further, a separator must be used between each pair of contiguous articles within the rack, so that the articles cannot be placed close against each other in side-by-side relation.

Another type of storage rack or case is disclosed in U.S. Pat. No. 3,756,383. This rack is used for storing magnetic tape cassettes or boxes of such cassettes which are slipped in between guiding ribs, and rest upon supporting horizontal ribs. Adjacent tape cases are separated from each other by partition elements which prevent storage of the maximum number of tape boxes over the length of the storage rack.

Another type of tape cassette holder for storing tape cassettes is that which is illustrated and described in U.S. Pat. No. 4,399,912. This rack is principally a support rack having a base plate and a back rib which prevents sliding of the cassettes out of the rack. A series of dividers separate the several cassettes, and this permits them to be grasped and removed from the rack.

Another type of storage system in which either boxed or unboxed tape cassettes can be stored is that which is described and depicted in U.S. Pat. No. 4,432,453. In this system, as in others discussed and described, dividers extend between the several boxes of tapes to maintain separation therebetween, and all of the tapes are located in alignment with each other when they are placed in the storage system.

None of the described prior art storage racks or boxes enable the storage objects or articles to be placed in contiguous, abutting relationship to each other as they are aligned from end-to-end within the rack, and placed in side-by-side relation. Moreover, none of them facilitates the staggered positioning of the articles stored in the rack so that exposed corners of alternate articles are easily accessible for grasping to remove each individual article without difficulty.

GENERAL DESCRIPTION OF THE PRESENT INVENTION

The present invention provides an aesthetically pleasing storage rack which has a series of alternating grooves or slots which, by virtue of their varying position or angulation with one another within the rack, support articles of a right parallelopiped configuration stored in the grooves or slots in such a fashion as will cause the corners thereof to be alternatively exposed. This facilitates easy grasping of each of the individual articles when it is desired to remove a single article from the rack. Moreover, the configuration of the several slots is such that, along with providing necessary vertical support of the articles in a staggered fashion of the type described, the rack also affords lateral support for the articles, so that the articles can flatly abut each other in a side-to-side relation, thus avoiding the need for inclusion of additional guides, spacers or separators. This enables the maximum number of articles to be supported within the storage rack from one end thereof to the other.

An important object of the invention is to provide an improved storage rack in which a multiplicity of articles of right parallelepiped configuration can be quickly and easily stored, and can be selectively removed in individual fashion without difficulty.

Another object of the invention is to provide a storage rack for storing compact audio discs of the type presently utilized for reproducing sound recordings in a high fidelity fashion, such storage rack accommodating these compact discs when they are contained in right parallelepiped cases.

Additional objects and advantages of the invention will become apparent as the following detailed description of the invention is read in conjunction with the accompanying drawings which illustrate a preferred embodiment of the invention.

GENERAL DESCRIPTION OF THE DRAWINGS

FIG. 1 is a plan view of the rack of the invention.

FIG. 2 is a front elevation view of the rack illustrated in FIG. 1.

FIG. 3 is an end elevation view of the rack depicted in FIG. 1, and showing, in dashed lines, a pair of compact disc storage containers of right parallelepiped configuration stored in the rack.

FIG. 4 is a sectional view taken along line 4—4 of FIG. 1, and illustrating, in dashed lines, one of the compact disc containers retained in the storage rack. A second phantom line which is included depicts the location in the rack of a second, adjacent slot for receiving another compact disc container in an offset relationship with respect to the container which is shown in dashed lines in FIG. 4.

FIG. 5 is a sectional view taken along line 5—5 of FIG. 1 and illustrating, in phantom lines, one of the compact storage disc containers held in the storage rack of the invention. There is also shown in FIG. 5, with a different type of dashed line, the positions of the bottom portions of adjacent slots, so provided for receiving a compact disc container on each adjacent side of the one shown in FIG. 5.

FIG. 6 is a structural detail view, in perspective illustrating a sub-component of the storage rack of the invention which can be utilized in constructing one embodiment of the invention in which a plurality of such structural components are secured together to make the rack.

DETAILED DESCRIPTION OF A PREFERRED EMBODIMENT OF THE INVENTION

The storage rack 8 of the invention can be molded as an integral unit made of a synthetic resin or plastic, or it can be made of multiple parts secured together by glueing, fasteners or other suitable means. In either case, the rack 8 is characterized in having a horizontally extending bottom side or base 10 which has a pair of supporting runners 12 and 14 secured thereto for supporting the rack on a table top or other flat supporting surface. The rack 8 also has a rear side 16 which lies in a substantially vertical plane, and terminates in an upper rear horizontally extending surface 17. The rack 8 is faced by a forward side designated generally by reference numeral 18 and best illustrated in FIG. 2 of the drawings. A pair of end facing plates 19 are secured to opposite ends of the rack 8.

The upwardly facing side of the rack, which is depicted in the top plan view of FIG. 1, consists of a series of contiguous alternating upwardly facing grooves which are molded into the rack, or which are formed by a series of interconnected parts in a manner hereinafter described. The series of alternating grooves includes a plurality of grooves 20a of a first configuration, and a plurality of grooves 20b of a second configuration. The grooves 20a are individually staggered and alternated with the individual grooves 20b, as will be noted in referring to FIG. 1.

The grooves 20a occupy different orientations to both the horizontal and vertical planes from those of grooves 20b so that, when these grooves are used for receiving and holding individual articles of a right parallelepiped configuration, corresponding approximately in width or thickness to the width or thickness of the respective individual groove, the corners of the stored articles will be alternately staggered to provide case of access to each article individually, and so that the portions of the rack which would define the supporting structure around the article at the upper side by each of these supporting grooves functions to afford lateral support to articles carried in the contiguous grooves within the rack.

The shapes and positional configurations of the grooves 20a and 20b are probably best illustrated by the detail of structure shown in FIG. 6 of the drawings. Here it will be noted that the groove 20a includes article-supporting bottom surfaces which include a forward bottom portion "X", and a rear portion "Y". The adjacent groove 20b, while occupying a different positional orientation, is, nevertheless, similar in shape, including, as article-supporting bottom surfaces, a forward bottom portion "X", and a rearward bottom portion "Y".

In referring to FIG. 6, it will be noted that both grooves 20a and 20b define a right angle between the respective article-supporting surface "X" and "Y". The article-supporting surface "X" of the groove or slot 20a projects further from the forward side 18 of the rack toward the rear side 16 thereof than does the article-supporting surface "X" of the groove 20b. In FIG. 6, it can further be noted that the rear, upwardly extending article-supporting surface "Y" of the slot 20b is longer than the article-supporting surface "Y" of the slot 20a, and that slot or groove 20b extends to a greater depth in the rack 8 (approaches closer to the bottom 10) than does the slot 20a.

It will also be perceived that each of the surfaces X and Y of each of the grooves 20a and 20b are defined by parallel opposed boundary edges, and that two of these boundary edges actually lie in substantially the same plane as two of the boundary edges of surfaces X and Y of the next adjacent slot 20a or 20b. Stated differently, a boundary edge of the forward article-supporting surface X of the slot 20a bears against one of the boundary edges of the forward article-supporting surface X of the slot 20b. In yet a different way of describing this relationship, the immediate or adjacent contiguous boundary edges of the article-supporting surfaces of adjacent slots lie in a common, vertically extending plane, and articles which are stored in these adjacent slots, and are of substantially the same width as the slots, are in side-by-side relation in which adjacent sides of these articles can contact each other. As hereinafter pointed out, the rack is therefore capable of accommodating the maximum number of articles over its entire length.

It will be noted in referring to FIGS. 1,2,4, & 6 that the front or forward side 18 of the rack is formed, in the illustrated embodiment of the invention, with alternating ridges and slots or recesses molded into this forward side. Thus, those portions of the rack which define the front faces of the slots 20b protrude or extend forward out of a common plane containing the front faces of the slots 20a. This embodiment of the rack is made in this fashion, both to please the eye, and also because this staggered type of configuration at the forward side of the rack functions to aid in the placement of parallelepiped shaped articles, such as compact audio disc cases, within the rack in the manner illustrated in FIGS. 4 and 5.

The storage rack 8 of the invention is used for containing right parallelepiped articles, such as those used to contain a compact audio disc. Articles thus stored are in a staggered array, as shown by the dashed line configurations appearing in FIGS. 3, 4 and 5. In FIG. 3 of the drawings, two of the articles 26 and 28 are shown in dashed lines as they appear when they are placed in two contiguous slots 20a and 20b, and are viewed in elevation from one end of the rack. It will be noted that the upper and forward corners of the stored articles 26 and 28 are staggered, and can be easily individually gripped between the thumb and forefinger of the user to remove any individual article or container from the storage rack 8.

This arrangement is further clarified by FIGS. 4 and 5. In FIG. 4, which is a section taken through the rack at the location shown by section line 4—4 in FIG. 2, the right parallelepiped piped case or container for a compact audio disc, denominated by reference numeral 26, is shown in the position it occupies when it rests in one of the slots or grooves 20b. It can be seen that one side of the parallelepiped case or container 26 rests upon the article-supporting surface "X" of the slot or groove 20b, and a contiguous or adjoining side rests upon the article-supporting surface "Y". In FIG. 5, the second container or article 28 is illustrated, and is shown in its stored position within the slot 20a. It will be noted in referring to FIGS. 4 and 5 that parts of the rack 8 which define each of the respective slots 20a and 20b afford lateral support to portions of the parallelepiped-shaped articles stored in the rack. These parts which afford such lateral support are perhaps best illustrated in FIG. 4 and 6 of the drawings, where the surfaces 30, 32 and 33 have been identified as three such vertically extending surfaces which afford the described lateral support for the article stored in the slots or grooves 20a and 20b.

Even though the grooves or slots 20a and 20b include a pair of bottom article-supporting surfaces which, in each case, form an angle of 90° with each other, it will be preceived that the surface "X" of the slot 20b extends at a steeper or greater acute angle with respect to the bottom 10 of the rack than does the surface "X" of the slot 20a.

In referring to FIGS. 3, 4 and 5 of the drawings, it will be perceived that although the articles stored are in close lateral proximity to one another as they are placed in adjacent slots or grooves 20a and 20b, there is no difficulty in getting the thumb and forefinger around any one of the articles to grip it. This is because at their forward upper edges, as shown in FIG. 3, the articles are separated, and therefore there is a space at the opposite top front corner of each of the articles which accommodates the thumb and the forefinger. Thus, any selected one of the articles can be removed from the storage rack quite easily. Such removal does not cause the contiguous or adjacent articles to fall over, however, because portions of the storage rack 8 which define exposed vertical surfaces, such as the surfaces 30, 32 and 33, provide lateral support to each of the articles remaining in the rack when others are removed. At the same time, there are no dividers located between articles, and therefore the maximum number of articles can be stored in a side-by-side relation over the entire length of the storage rack.

In the construction of the storage rack, a preferred embodiment of the rack entails molding the rack from plastic material, and it should be noted that the forward side 18 of the rack may be molded with alternating ribs and grooves as has been previously described, and as is depicted in the preferred embodiment illustrated in the drawings. Alternatively, the forward side of the rack may be of one or more substantially monoplanar (unbroken) surfaces.

It should also be pointed out that instead of molding the entire storage rack 8 as an integral unit, a plurality of the structural detail elements of the configuration shown in FIG. 6 can be formed from wood or other suitable material, and then joined side-to-side to build up the storage rack 8 to the total desired length. In such case, the overall configuration of the rack will be substantially identical to that shown in FIG. 1-3.

Although a preferred embodiment of the invention has been herein described in order to enable those skilled in the art to understand the manner in which the invention is constructed, and the way that the storage rack operates, it will be understood that various changes and innovations can be made in the illustrated storage rack without departure from the basic principles which underlie the invention. Changes and innovations of this type are therefore deemed to be circumscribed by the spirit and scope of the invention, except as the same may be necessarily limited by the appended claims, or reasonable equivalents thereof.

What is claimed is:

1. A storage rack for storing articles of right parallelepiped configuration, such storage rack comprising a solid body which includes a pair of opposite end faces, a front side extending between the end faces, a rear side extending between the end faces and parallel to the front side, and a lower side, said body having formed therein, and lying generally in a series of parallel, contiguous, substantially vertically extending planes, a plurality of article-receiving grooves, adjacent grooves within said plurality being staggered with respect to each other, so that articles supported therein are vertically staggered with respect to each other, and each of said grooves include a pair of intersecting, article-supporting surfaces, said pair of article-supporting surfaces including a forward article-supporting surface and a rear article-supporting surface, the two article-supporting surfaces in each of said grooves intersecting each other to define an angle subtended by the intersecting article-supporting surfaces at the point of intersection therebetween, and said grooves opening generally upwardly in order to receive said articles therein for storage, the forward article-supporting surface of alternate ones of said grooves being disposed in a plane which is offset from a plane containig the forward article-supporting surfaces of the intervening remainder of said grooves located between said alternate ones of said grooves, and said rear article-supporting surfaces of alternate grooves being disposed in a plane which is offset from a plane commonly containing all of the rear article-supporting surfaces of the intervening remainder of said grooves located between said alternate ones of said grooves, whereby contiguous articles placed in said article-receiving grooves are staggered with respect to each other in an alternately repeating pattern, and are thereby more accessible in presenting portions of contiguous articles for grasping without interference by other articles, each of said forward article-supporting surfaces having a pair of opposed boundary side edges each lying in a vertical plane which also contains one of the boundary side edges of the immediately adjacent forward article-supporting surface of the immediately adjacent groove, and also contains a boundary side edge of the rear article-supporting surface of said immediately adjacent groove, each of said grooves in each pair of adjacent grooves being located in immediately adjacent contiguous positional relationship to the other groove in that adjacent pair, whereby any two articles stored contiguously therein, and occupying such adjacent grooves can abut flatly against each other in side-by-side relation without any intervening vertically expending structure forming a portion of said storage rack separating such two contiguous adjacent pairs of stored articles.

2. A storage rack as defined in claim 1 wherein the two article-supporting surfaces in each of said grooves intersect each other at a right angle.

3. A storage rack as defined in claim 1 wherein the forward article-supporting surface in each of said grooves extends downwardly at an acute angle to the horizontal, and the intersecting rear article-supporting surface in the each of said grooves projects upwardly and rearwardly at an acute angle to the rear side of said storage rack.

4. A storage rack as defined in claim 1 wherein said grooves are alternately staggered so that each one of said grooves, except for the endmost grooves, is between a pair of grooves each having a forward article-supporting surface which is not parallel to the forward article-supporting surface of said one groove, and each of said grooves groove in said pair of grooves is characterized in having a rear article-supporting surface face which is not parallel to the rear article-supporting surface of said one groove, whereby the adjacent articles stored therein have non-aligned, easily grasped upper corners.

5. A storage rack for storing articles of right parallelepiped configuration, such storage rack comprising a solid body which includes a pair of opposite end faces, a front side, a rear side and a lower side, said body having formed therein and lying generally in a series of parallel, substantially vertically extending planes, a plurality of contiguous, article-receiving grooves, each of said grooves including a pair of intersecting article-supporting surfaces, said pair of article-supporting surfaces including a forward article-supporting surface and a rear article-supporting surface, the two article-supporting surfaces in each of said grooves intersecting each other at a right angle, and said grooves opening upwardly to receive right parallelepiped-shaped articles therein for storage, the forward article-supporting surface in each of said grooves extending downwardly at an acute angle to the horizontal, and the intersecting rear article-supporting surface which extends normal to said forward article-supporting surface, projecting upwardly and rearwardly at an acute angle to the rear side of said storage rack, said grooves being alternately staggered so that each one of said grooves, except for the endmost grooves, is between a pair of grooves each having a forward article-supporting surface which is not parallel to the forward article-supporting surface of said one groove, and each of said grooves in said pair of grooves is characterized in having a rear article-supporting surface which is not parallel to the rear article-supporting surface of said one groove, whereby the adjacent articles stored therein have non-aligned, easily, grasped upper corners.

6. A storage rack as defined in claim 5 wherein each adjacent pair of said grooves are in immediate contiguous positional relationship to each other whereby two articles stored therein, and occupying adjacent grooves, will abut flatly against each other in side-by-side relation.

7. A storage rack for storing articles of right parallelepiped configuration, such storage rack comprising a solid body which includes a pair of opposite end faces, a front side, a rear side and a lower side, said body having formed therein, and lying generally in a series of parallel, substantially vertically extending planes, a plurality of contiguous, article-receiving grooves, each of said grooves including a pair of intersecting article-supporting surfaces, said pair of article-supporting surfaces in each groove including a forward, article-supporting surface and a rear article-supporting surface, the two article supporting surfaces in each of said grooves intersecting each other at a right angle, and said grooves opening upwardly to receive right parallelepiped-shaped articles therein for storage, the forward article supporting surface in each of said grooves extending downwardly at an acute angle to the horizontal, and the intersecting rear article-supporting surface, which extends normal to said forward article-supporting surface, projecting upwardly and rearwardly at an acute angle to the rear side of said storage rack and to the vertical, each adjacent and contiguous pair of said grooves being disposed in immediate contiguous positional relationship to each other, and having a common vertical planar boundary therebetween whereby two articles stored therein and occupying adjacent grooves will abut flatly against each other in side-by-side relation without any vertically extending intervening structural portion of said storage rack separating such adjacent pairs of articles stored therein.

8. A storage rack as defined in claim 7 wherein said storage rack solid body comprises a plurality of substantially identically shaped solid sections secured toether in side-by-side relation to form said solid body.

9. A storage rack as defined in claim 7 wherein said storage rack is an integrally molded unit.

10. A storage rack as defined in claim 7 wherein said grooves are alternately staggered so that each one of said grooves, except for the endmost grooves, is between a pair of grooves each having a forward article-supporting surface which is not parallel to the forward article-supporting surface of said one groove, and each of grooves in said pair of grooves is characterized in having a rear article-supporting surface which is not parallel to the rear article-supporting surface of said one groove whereby the adjacent articles stored therein have non-aligned, easily grasped upper corners.

11. A storage rack as defined in claim 10 wherein said storage rack is an integrally molded unit.

12. A storage rack for storing articles of right parallelepiped configuration, such storage rack comprising a solid body which includes a pair of opposite end faces, a front side, a rear side and a lower side, said body having formed therein, and lying generally in a series of parallel, substantially vertically extending planes, a plurality of contiguous, article-receiving grooves, each of said grooves including a pair of intersecting article-supporting surfaces, said pair of article-supporting surfaces including a forward article-supporting surface and a rear article-supporting surface, the two article-supporting surfaces in each of said grooves intersecting each other at a right angle, and said grooves opening upwardly to receive right parallelepiped-shaped articles therein for storage, the forward article-supporting surface in each of said grooves extending downwardly at an acute angle to the horizontal, and the intersecting rear article-supporting surface, which extends normal to said forward article-supporting surface, projecting upwardly and rearwardly at an acute angle to the rear side of said storage rack, said grooves being alternately staggered so that each one of said grooves, except for the endmost grooves, is between a pair of grooves each having a forward, article-supporting surface which is not parallel to the forward article-supporting surface of said one groove, and each of said grooves in said pair of grooves being characterized in having a rear article-supporting surface which is not parallel to the rear article-supporting surface of said one groove, whereby the adjacent articles stored therein have non-aligned, easily grasped upper corners, and wherein each adjacent pair of said grooves are in immediate contiguous positional relationship to each other, whereby two articles stored therein and occupying adjacent grooves will abut flatly against each other in side-by-side relation.

13. A storage rack for storing articles of right parallelepiped configuration, such storage rack comprising a solid body which includes a pair of opposite end faces, a front side extending between the end faces, a rear side extending between the end faces and parallel to the front side, and a lower side, said body having formed therein, and lying generally in a series of parallel, substantially vertically extending planes, a plurality of contiguous, upwardly opening, article-receiving grooves, adjacent grooves within said plurality being staggered with respect to each other, and each of said grooves including a pair of intersecting, article-supporting surfaces, said pair of article-supporting surfaces including a forward article-supporting surface and a rear article-supporting surface, the two article-supporting surfaces in each of said grooves intersecting each other to define an angle subtended by the intersecting article-supporting surfaces at the point of intersection therebetween, and said grooves opening upwardly to receive said articles therein for storage, the forward article-supporting surfaces of alternate ones of said grooves being disposed in a plane which is offset from a plane containing the forward article-supporting surfaces of the remainder of said grooves, and said rear article-supporting surfaces of alternate grooves being disposed in a plane which is offset from a plane commonly containing all of the rear article-supporting surfaces of the remainder of said grooves, whereby contiguous articles placed in said article-receiving grooves are staggered with respect to each other, and are more accessible in presenting portions of each pair of contiguous articles for grasping without inteference by the other of the articles in said pair, each of said contiguous grooves being located in immediately adjacent positional relationship to each other, whereby any two articles stored therein, and occupying adjacent grooves can abut flatly against each other in side-by-side relation, said grooves being alternately staggered so that each one of said grooves, except for the endmost grooves, is between a pair of grooves each having a forward article-supporting surface which is not parallel to the forward article-supporting surface of said one groove, and each groove in said pair of grooves is characterized in having a rear article-supporting surface which is not parallel to the rear article-supporting surface of said one groove, whereby the adjacent articles stored therein have nonaligned, easily grasped upper corners.

* * * * *

UNITED STATES PATENT AND TRADEMARK OFFICE
CERTIFICATE OF CORRECTION

PATENT NO. : 4,723,662
DATED : February 9, 1988
INVENTOR(S) : Charles A. Johnson It is certified that error appears in the above-identified patent and that said Letters Patent are hereby corrected as shown below:

<u>In the Specification:</u>
In Column 1, line 18, delete the word "tested" and insert -rested-.
In Column 1, line 20, delete the word "parallelepipid" and insert -parallelepiped-.
In Column 1, line 61, delete the word "storage" and insert -stored-.
In Column 2, line 8, delete the word "parallelopiped" and insert -parallelepiped-.
In Column 2, line 10, delete "alternatively" and insert -alternately-.
In Column 3, line 40, delete "case" and insert -ease-.
In Column 4, line 53, delete the word "piped".
<u>In the Claims:</u>
In Column 6, line 44, delete "pending" and insert -tending-.
In Column 8, line 3, delete "toether" and insert -together-.
In Column 10, line 15, delete "nonaligned" and insert -non-aligned-.

Signed and Sealed this

Twelfth Day of July, 1988

*Attest:*

DONALD J. QUIGG

*Attesting Officer*  *Commissioner of Patents and Trademarks*